(12) United States Patent
Wedin et al.

(10) Patent No.: US 12,234,071 B2
(45) Date of Patent: Feb. 25, 2025

(54) LIGHT WEIGHT CORRUGATED PACKAGING MATERIAL

(71) Applicant: Stora Enso OYJ, Helsinki (FI)

(72) Inventors: Irene Wedin, Bromma (SE); Dan Persson Norgren, Borlänge (SE); Reijo Vapa, Ii Asema (SE); Seppo Lampainen, Lahti (FI); Kalle Vertanen, Lahti (FI)

(73) Assignee: Stora Enso OYJ, Helsinki (FI)

( * ) Notice: Subject to any disclaimer, the term of this patent is extended or adjusted under 35 U.S.C. 154(b) by 606 days.

(21) Appl. No.: 17/622,363

(22) PCT Filed: Jun. 25, 2020

(86) PCT No.: PCT/IB2020/056007
§ 371 (c)(1),
(2) Date: Dec. 23, 2021

(87) PCT Pub. No.: WO2020/261165
PCT Pub. Date: Dec. 30, 2020

(65) Prior Publication Data
US 2022/0242635 A1  Aug. 4, 2022

(30) Foreign Application Priority Data
Jun. 26, 2019 (SE) .................... 1950794-6

(51) Int. Cl.
*B32B 29/08* (2006.01)
*B32B 7/12* (2006.01)
(Continued)

(52) U.S. Cl.
CPC .............. *B65D 65/403* (2013.01); *B32B 7/12* (2013.01); *B32B 29/005* (2013.01); *B32B 29/08* (2013.01); *B65D 5/64* (2013.01); *B32B 2250/26* (2013.01); *B32B 2255/12* (2013.01); *B32B 2255/26* (2013.01); *B32B 2307/558* (2013.01); *B32B 2307/718* (2013.01); *B32B 2439/70* (2013.01)

(58) Field of Classification Search
CPC ............................. B65D 65/403; B32B 29/08
See application file for complete search history.

(56) References Cited

U.S. PATENT DOCUMENTS

| 5,794,770 | A  | 8/1998 | Plomgren et al. |
| 6,190,744 | B1 | 2/2001 | Akao et al. |
| 2017/0166372 | A1 | 6/2017 | Bugas |

FOREIGN PATENT DOCUMENTS

| EP | 0213957 A2 | 3/1987 |
| EP | 3054228 A1 | 8/2016 |

(Continued)

OTHER PUBLICATIONS

International Search report from corresponding PCT application No. PCT/IB2020/056007 mailed on Oct. 1, 2020.

(Continued)

*Primary Examiner* — William P Watkins, III
(74) *Attorney, Agent, or Firm* — Greer, Burns & Crain, Ltd.

(57) ABSTRACT

The invention discloses a corrugated packaging material with a low weight and high strength properties, which material can be recycled with the office paper recycling stream. The corrugated packaging material of the invention exhibits good strength and stiffness properties, a low wash board tendency and provides a good printing surface.

12 Claims, 1 Drawing Sheet

(51) Int. Cl.
*B32B 29/00* (2006.01)
*B65D 5/64* (2006.01)
*B65D 65/40* (2006.01)

(56) References Cited

FOREIGN PATENT DOCUMENTS

| WO | 9500399 A1 | 1/1995 |
|---|---|---|
| WO | 03069061 A1 | 8/2003 |
| WO | 2017163176 A1 | 9/2017 |
| WO | 2018083590 A1 | 5/2018 |

OTHER PUBLICATIONS

Chinga-Carrasco, Gary, Cellulose fibres, nanofibrils and microfibrils: The morphological sequence of MFC components from a plant physiology and fibre technology point of view, Chinga-Carrasco Nanoscale Research Letters, 2011, 6:417.
Fengel, D., Utrastructural behaviour of cell wall polysacchariedes, TAPPI, 1970, vol. 53, No. 3, pp. 497-503.(abstract only).
Kirwan, M., J. Paper and Paperboard, Packaging Technology, Blackwell Publishing, 2005. (excerpt only).

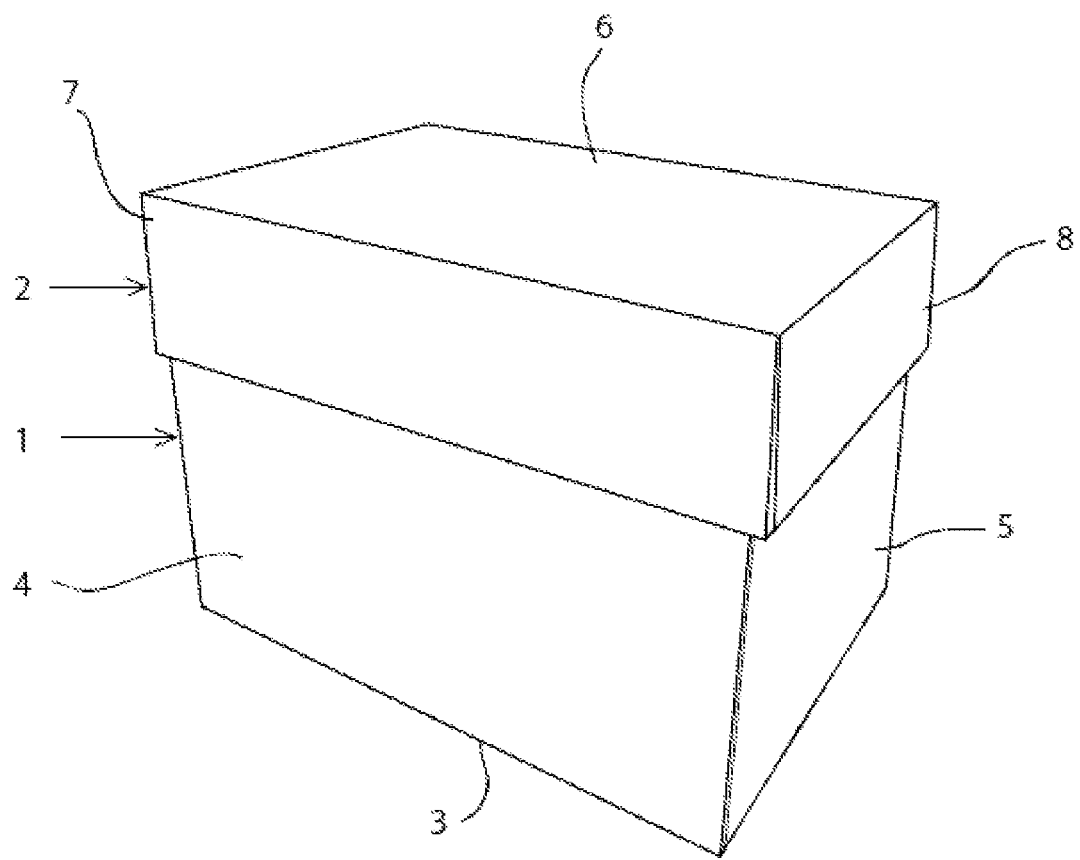

LIGHT WEIGHT CORRUGATED PACKAGING MATERIAL

This application is a U.S. National Phase under 35 U.S.C. § 371 of International Application No. PCT/IB2020/056007, filed Jun. 25, 2020, which claims priority under 35 U.S.C. §§ 119 and 365 to Swedish Application No. 1950794-6 filed Jun. 26, 2019.

TECHNICAL FIELD

The present invention relates to a light weight corrugated packaging material

BACKGROUND

Corrugated board is a packaging material which can be converted to different types of packaging solutions. The corrugated board is a fiber based material comprising a corrugated/fluted medium (fluting) and at least one flat liner or linerboard attached onto a surface of the fluted medium, thus forming a sandwich structure. The central paper layer, called fluted medium, is formed by using heat, moisture and pressure, into a corrugated shape using a corrugator. One or two flat papers, called liners, are glued to the tips of the corrugated medium. The sandwich can be formed in different ways such as in single, double, and triple walls as described in Kirwan M., J., Paper and Paperboard. Packaging Technology, Blackwell Publishing 2005.

Conventionally, corrugated board has been used for packaging applications when a high strength is needed, such as for production of shipping containers. Micro-flute corrugated board has in recent years been proposed to replace folding boxboard and SBS in consumer packaging.

Sheet-like material, like office paper, is often packaged in a paper wrapping, enclosing a bundle of papers. In order to facilitate the handling of the paper bundles, to improve the strength of the bundles and to further protect the bundles, it is common to arrange a plurality of bundles into a packaging unit. WO 95/00399 discloses a conventional packaging unit for packaging sheet-like material, such as paper, comprising a box with a lid made from corrugated fiberboard or from cardboard. Such corrugated fiberboard is preferably made from unbleached or semi-bleached pulp.

Increased environmental concerns has put higher demands on the recycling of paper and packaging materials. At the handling of the above mentioned paper bundles and packaging unit, the user has to sort the paper to the recycling stream of office paper and the packaging unit (box and lid) to the recycling stream of paperboard. There thus remains a need for a simplified process for handling the materials to be recycled. In addition, the demand for packaging material with lighter weight, thus consuming less raw material, has also increased.

SUMMARY

It is an object of the present invention to provide a packaging material with low weight and high or acceptable strength properties and which material is possible to recycle as office paper.

The invention is defined by the appended independent claims. Embodiments are set forth in the appended dependent claims and in the following description.

In a first aspect, the invention discloses a corrugated packaging material comprising at least one liner and one fluted paper, wherein said fluted paper is made from a first paper having a grammage of between 50 to 100 gsm, preferably between 50 to 80 gsm, a total filler content of below 5 wt %, preferably below 2 wt %, and a bulk of at least 1.5 cm$^3$/g, which first paper is made from a pulp comprising 100 wt % bleached pulp, whereof at least 80 wt % is bleached mechanical pulp, and wherein said liner is made from a second paper having a grammage of between 50 to 100, preferably 70 to 100 gsm, which second paper is made from a pulp comprising 100 wt % bleached pulp.

It has surprisingly been found that it is possible to make a low weight corrugated packaging material with high strength properties, which material can be recycled with the office paper recycling stream. The corrugated packaging material of the invention exhibits good strength and stiffness properties, a low wash board tendency and provides a good printing surface. The paper to form the fluted paper is preferably uncalendered or light calendered paper to provide the high bulk.

In a second aspect, the invention relates to a packaging unit for sheet like material, such as paper of A4 size, comprising a box (1) having a rectangular shape and comprising a bottom panel (3) and four side walls (4, 5, 6, 7), and a lid (2) having a rectangular shape and comprising a top wall (8) and four side walls (8, 9, 10, 11), wherein the box (1) and the lid (2) are made from the packaging material described in the first aspect of the invention In a third aspect, the invention relates to the use of the packaging material according to the first aspect in packaging of sheet like material, such as paper of A4 size.

In a fourth aspect, the invention relates to the use of the packaging material according to the first aspect in packaging of food.

Measurement and Evaluation Methods

The following methods and evaluation methods are referred to in the description and in the patent claims.

The grammage refers to the weight expressed as grams per square meter, gsm or g/m$^2$ and is measured in accordance with ISO 536. As used herein, gsm and g/m$^2$ may be used interchangeable.

Bulk is measured in accordance with ISO 534:2005

Edge crush test value (ECT) is measured in accordance with ISO 3037. The ECT value is a measure of the edgewise compressive strength of corrugated board.

Geometric SCT index is measured in accordance with ISO 9895 and is calculated as the square root of the product of the SCT index in MD and CD. The SCT index defines the compression strength of the paper.

Bending stiffness is measured in accordance with ISO 5628.

The washboard effect is measured by use of CORROCHECK and is defined as the deviation in height of a nearly flat surface. The deviation in height (or depth respectively) named WBE is calculated as follows:

$$WBE = 3/2n \sum_{k=1}^{n} hi$$

Wherein $hi = zi - ri$

Corrugated cardboard samples are not perfectly flat. Therefore, the theoretical surface zi is calculated first. hi is calculated as the difference between theoretical flat surface zi and real surface ri.

BRIEF DESCRIPTION OF THE DRAWINGS

FIG. 1 shows a front and top perspective view of a box according to one or more embodiments of the present invention.

DETAILED DESCRIPTION

The inventors of the present invention has developed a low grammage corrugated packaging material, which is made using conventional or micro-flute. The inventive packaging material offers an excellent print quality in both flexo- and offset printing, a lower weight, lower cost and lower carbon footprint compared to packaging material available on the market. In addition, the material can be made using conventional corrugators in large industrial scale, at high speeds and at industrial condition. It can further be easily converted in industrial conditions.

The corrugated packaging material of the invention comprises at least one liner and one fluted paper.

The fluted paper is made from a first paper having a grammage of between 50 to 100 gsm, preferably between 50 to 80 gsm. The total filler content of the first paper is below 5 wt %, or preferably below 2 wt %. The first paper further exhibits a bulk of at least 1.5 cm$^3$/g or preferably of at least 1.7 cm$^3$/g. The first paper is made from a pulp comprising 100 wt % bleached pulp, whereof at least 80 wt % is bleached mechanical pulp. The remaining pulp is preferably bleached chemical pulp. In one embodiment, said first paper is made from 80-100 wt % or 90-100 wt % bleached mechanical pulp and 0-20 wt % or 0-10 wt % bleached chemical pulp.

The at least one liner is made from a second paper having a grammage of between 50 to 100, preferably 70 to 100 gsm. The said second paper is made from a pulp comprising 100 wt % of bleached pulp, which can be mechanical and/or chemical pulp. In embodiments, the second paper may be the same as the first paper.

Mechanical pulp means pulp produced by subjecting wood fibers to mechanical energy causing the bonds between the fibers of the wood to break and fibers and fiber fragments to be released. In the definition of mechanical pulp is groundwood pulp, e.g. stone groundwood pulp (SGP) or pressure groundwood (PGW) pulp, as well as thermomechanical pulp (TMP) or chemimechanical pulp (CTMP) included. Chemical pulp means pulp that has been treated with digestion chemicals for the delignification of cellulose fiber, including e.g. sulphate (kraft) pulp and/or sulphite pulp.

The corrugated packaging material of the invention can have e-flute or microflute structure. Most preferably, the corrugated paper has an e-flute structure and can thereby be formed using conventional machinery. Flute types are defined by their thickness and the number of flutes per linear foot The "E-flute" has a typical flute thickness of 1.1 to 1.5 mm and a flutes per linear foot of 90+/−4. The microflute can be F- or N-type microflute, where N-flute typically has a flute thickness of 0.8 and a flutes per lineal foot of 120+/−, while N-flute typically has a flute thickness of 0.5 mm and flutes per lineal foot of 170+/−4.

The liner of the corrugated packaging material is attached to said fluted paper by means of an adhesive. The adhesive can be a conventional corrugated adhesive known in the art. Preferably, the adhesive exhibits a stable viscosity enabling constant and full coverage application. The adhesive is preferably applied by use of a rod applicator, which enables a more precise application and better adjustability.

In one preferred embodiment, the adhesive comprises starch and microfibrillated cellulose (MFC). This kind of adhesive exhibits a stable viscosity and has shown to reduce the washboarding of the packaging material even further.

In one embodiment, the adhesive comprises starch in an amount of 50-99.5 wt % and MFC in an amount of 0.5-50 wt %, calculated on the total solid content of the adhesive.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 10 to about 300 m$^2$/g, or more preferably 30-200 m$^2$/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

In one embodiment, the packaging material exhibits an edge crush test value (ECT) according to ISO 3037 of at least 2 kN/m, preferably of at least 2.5 kN/m.

In one embodiment, the said first paper exhibits a geometric SCT index according to ISO9895 of above 1.

The corrugated packaging material according to the invention preferably comprises at least two liners and at least one corrugated paper. The corrugated packaging material may also comprise more than one corrugated papers and more than two liners. The liner is attached to at least one surface of the corrugated paper by an adhesive.

In one embodiment, the packaging material comprises an outer liner formed from said second paper and being adapted to form a printing surface, an inner liner adapted to be in contact with the content of the thereof formed packaging, wherein the fluted paper is arranged between the inner and outer liner and wherein the inner liner is formed from said first paper.

The second paper, forming said outer liner, may be made from a pulp comprising between 70-100 wt % bleached kraft pulp and between 0-30 wt % wt % bleached mechanical pulp. In this way, a surface suitable for printing is formed. The outer liner may further be pigment coated.

In one embodiment, all the liner/s and fluting/s of the corrugated packaging material are made from papers having a grammage of between 50-100 gsm, preferably between 70-100 gsm.

The packaging material of the invention can advantageously be used in packaging for e.g. sheet like material such as paper of A4 size or for dry food such as berries, hamburgers or pizzas.

The invention further relates to a packaging unit for sheet like material, which packaging unit is made from the packaging material of the invention. With reference to FIG. 1, an exemplifying embodiment of such a packaging unit will be described. The packaging unit includes a box (1) and a lid (2). The box has a rectangular shape and includes a bottom panel (3) and four side walls (4, 5, 6, 7). Two of the side walls (4, 6) form long sides of the box and the other two the short sides of the box. The lid (2) is also rectangular shaped and includes a top wall (8) and four side walls (8, 9. 10, 11).

Traditionally, such a packaging unit is made from cardboard or corrugated board with higher gram mage. The present invention enables such a packaging unit to be made from a packaging material with lower grammage and which can be recycled in the same stream as the office paper which is packed in the packaging unit. This facilitates the sorting of the recycling material and enables for offices to only provide one, single sorting container.

Example 1

In order to evaluate the packaging material of the invention, a test series was performed in which a corrugated packaging material with an inner and an outer liner arranged on both sides of a corrugated paper was made. The inner liner and the corrugated paper was made from a first paper (paper 1), while the outer liner was made from a second paper (paper 2). The first paper was an uncoated light calandered paper made from 80 wt % bleached TMP and 20 wt % bleached kraft pulp and with a total filler content of 2 wt %. The second paper was an uncoated light calandered paper made from 100 wt % bleached kraft pulp and with a total filler content of 22 wt %. The properties of the papers used in this example 1 are shown in table 1.

TABLE 1

|  | Paper 1 | Paper 2 |
| --- | --- | --- |
| Grammage [gsm] | 70 | 70 |
| Bulk [ ] | 1.8 | 1.0 |
| Geometric SCT index | 0.98 | 1.24 |

The fluted paper was made from paper 1 using e-flute. The corrugated paper was arranged between the inner and the outer liner to form the packaging material. The properties of the thereby made packaging material is shown in table 2.

TABLE 2

|  | Test results, Packaging material |
| --- | --- |
| Thickness [mm] | 1.39 |
| Bending Stiffness [Nm] | 0.61 |
| Edge crush test (ECT) [kN/m] | 2.56 |
| Wash board average [mm] | 0.028 |
| Washboard min [mm] | 0.022 |
| Washboard max [mm] | 0.031 |

As can be seen in table 2, the packaging material of the invention shows good strength properties as well as resistance to washboarding.

The invention claimed is:
1. A corrugated packaging material comprising:
   at least one liner and at least one fluted paper, wherein
      said at least one fluted paper comprises a first paper having a grammage of between 50 to 100 gsm, a total filler content of below 5 wt % and a bulk of at least 1.5 cm³/g, wherein said first paper is made from a pulp comprising 100 wt % bleached pulp, whereof at least 80 wt % is bleached mechanical pulp, and wherein
      said at least one liner comprises a second paper having a grammage of between 50 to 100, wherein said second paper is made from a pulp comprising 100 wt % bleached pulp.
2. The corrugated packaging material according to claim 1, wherein the at least one fluted paper has an e-flute structure.

3. The corrugated packaging material according to claim 1, wherein the at least one liner is attached to said at least one fluted paper by means of an adhesive, wherein said adhesive comprises starch and microfibrillated cellulose.

4. The corrugated packaging material according to claim 1, wherein the corrugated packaging material exhibits an edge crush test value (ECT) according to ISO 3037 of at least 2 kN/m.

5. The corrugated packaging material according to claim 1, wherein the at least one fluted paper exhibits a geometric SCT index according to ISO9895 of above 1.

6. The corrugated packaging material according to claim 1, wherein the packaging material further comprises:
an outer liner formed from said second paper and configured to form a printing surface, an inner liner adapted configured to be in contact with contents of the corrugated packaging material,
wherein the at least one fluted paper is arranged between the inner liner and outer liner, and
wherein the inner liner is formed from said first paper.

7. The corrugated packaging material according to claim 1, wherein each liner and each fluted paper of the corrugated packaging material comprise papers having a grammage of between 50-100 gsm.

8. The corrugated packaging material according to claim 6, wherein the second paper is made from a pulp comprising between 70-100 wt % bleached kraft pulp and between 0-30 wt % bleached mechanical pulp.

9. A packaging unit for sheet like material comprising:
a box having a rectangular shape and comprising a bottom panel and four side walls, and
a lid having a rectangular shape and comprising a top wall and four side walls,
wherein the box and the lid are made from a corrugated packaging material comprising:
at least one liner and at least one fluted paper,
wherein said at least one fluted paper comprises a first paper having a grammage of between 50 to 100 gsm, a total filler content of below 5 wt % and a bulk of at least 1.5 cm$^3$/g,
wherein said first paper is made from a pulp comprising 100 wt % bleached pulp, whereof at least 80 wt % is bleached mechanical pulp,
wherein said at least one liner comprises a second paper having a grammage of between 50 to 100, and
wherein said second paper is made from a pulp comprising 100 wt % bleached pulp.

10. The corrugated packaging material according to claim 6, wherein said contents comprise food.

11. The corrugated packaging material according to claim 1, wherein said second paper has a grammage of between 70 to 100.

12. The corrugated packaging material according to claim 1, wherein the corrugated packaging material exhibits an edge crush test value (ECT) according to ISO 3037 of at least 2.5 kN/m.

* * * * *